(12) United States Patent
Clevorn et al.

(10) Patent No.: US 9,301,130 B2
(45) Date of Patent: Mar. 29, 2016

(54) BASE STATION, METHOD FOR CONTROLLING A COMMUNICATION TERMINAL, COMMUNICATION TERMINAL AND METHOD FOR OPERATING A COMMUNICATION TERMINAL

(75) Inventors: Thorsten Clevorn, Duesseldorf (DE); Juergen Kreuchauf, San Francisco, CA (US); Alper Ceylan, Duisburg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/290,167

(22) Filed: Nov. 7, 2011

(65) Prior Publication Data
US 2013/0115934 A1  May 9, 2013

(51) Int. Cl.
*H04M 3/00* (2006.01)
*H04W 8/24* (2009.01)

(52) U.S. Cl.
CPC ................... *H04W 8/245* (2013.01)

(58) Field of Classification Search
CPC ............ H04W 8/425; H04M 1/72525; H04M 1/72522
USPC ................. 455/418, 419, 561, 522, 69, 422.1
See application file for complete search history.

(56) References Cited

U.S. PATENT DOCUMENTS

| | | | |
|---|---|---|---|
| 6,804,216 B1* | 10/2004 | Kuwahara et al. | ............ 370/335 |
| 7,072,628 B2 | 7/2006 | Agashe et al. | |
| 7,925,302 B2 | 4/2011 | Ulupinar et al. | |
| 8,170,618 B1* | 5/2012 | Varma et al. | ................ 455/562.1 |
| 2004/0266474 A1* | 12/2004 | Petrus | ............................ 455/525 |
| 2005/0197080 A1* | 9/2005 | Ulupinar et al. | ............... 455/135 |
| 2006/0221894 A1 | 10/2006 | Casaccia et al. | |
| 2008/0132265 A1* | 6/2008 | Tudosoiu | ....................... 455/522 |
| 2009/0215418 A1 | 8/2009 | Thomas et al. | |
| 2012/0115431 A1* | 5/2012 | Kim et al. | ................... 455/404.1 |

FOREIGN PATENT DOCUMENTS

| | | |
|---|---|---|
| CN | 1250579 A | 4/2000 |
| CN | 101442779 A | 5/2009 |
| CN | 101606324 A | 12/2009 |
| GB | 2448481 A | 10/2008 |
| GB | 2472978 A | 3/2011 |
| WO | 9832294 A2 | 7/1998 |
| WO | 2008064925 A1 | 6/2008 |

OTHER PUBLICATIONS

Office Action received for CN Patent Application No. 201210439851.7, dated Jan. 27, 2015, 6 pages of Office Action and 10 pages of English translation.
Office Action received for related CN Patent Application No. 201210439851.7, dated Oct. 10, 2015, 5 pages of Office Action and 11 pages of English translation.
DE Office Action received for related DE Patent Application No. 10 2012 109 444.6, dated Oct. 9, 2015, 7 pages of Office Action and 4 pages of English translation.

* cited by examiner

*Primary Examiner* — Nghi H Ly (57) ABSTRACT

According to one embodiment, a base station of a mobile communication network is provided comprising a message generator configured to generate a message indicating that at least one mobile communication terminal should use a reception enhancement functionality and a transmitter configured to transmit the message to the at least one mobile communication terminal.

12 Claims, 7 Drawing Sheets

BASE STATION, METHOD FOR CONTROLLING A COMMUNICATION TERMINAL, COMMUNICATION TERMINAL AND METHOD FOR OPERATING A COMMUNICATION TERMINAL

TECHNICAL FIELD

The present disclosure relates to a base station, a method for controlling a communication terminal, a communication terminal and a method for operating a communication terminal.

BACKGROUND

Modern communication terminals typically have reception performance enhancement functionalities like receive diversity, equalization and interference cancellation. Typically, there is a trade-off between the enhanced performance provided by such functionalities and the increased power consumption on the communication terminal side when using such functionalities.

SUMMARY

In one embodiment, a base station of a mobile communication network is provided which may include a message generator configured to generate a message indicating that at least one mobile communication terminal should use a reception enhancement functionality and a transmitter configured to transmit the message to the at least one mobile communication terminal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
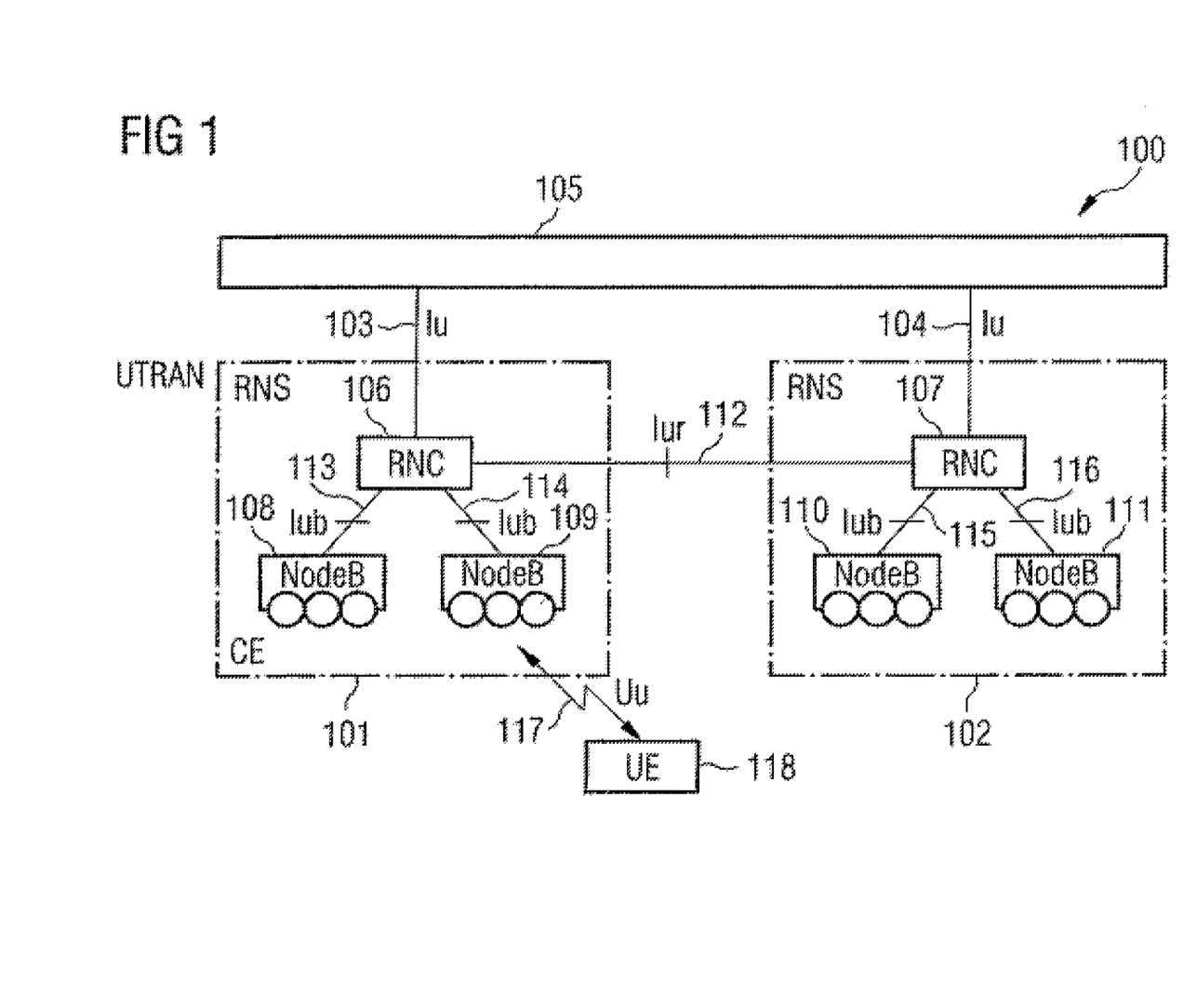
FIG. 1 shows a communication system according to an embodiment.

FIG. 1 shows a communication system 100 according to an embodiment.

The communication system 100 is a cellular mobile communication system (also referred to as cellular radio communication network in the following) including a radio access network (e.g. an UTRAN, UMTS (Universal Mobile Telecommunications System) Terrestrial Radio Access Network), which has a plurality of mobile radio network subsystems (RNS) 101, 102, which are respectively connected to the UMTS core network (CN) 105 by means of what is known as an Iu interface 103, 104. The radio access network and the core network 105 are also referred to as the network side (or as the mobile communication network) of the mobile communication system.

A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Control and user data are transmitted between a respective UMTS base station 108, 109, 110, 111 and a mobile terminal 118 (also referred to as UE, user equipment, e.g. a mobile phone), in a mobile radio cell using an air interface, called Uu air interface 117 in line with UMTS, e.g. on the basis of a multiple access method.

According to one embodiment, the mobile terminal 118 can have certain enhancement functionalities (or features), which for example include processing a received signal according to a certain algorithm, which can be used to improve the performance of reception of signals from the base station 108, 109, 110, 111, i.e. can be used to enhance the reception of data from the base station 108, 109, 110, 111, such that, for example, a lower transmission power is required for the same quality of reception (e.g. for the same number of transmission errors). Examples for such enhancement functionalities may for example include:

Receive diversity (RxDiv)
Equalization
Interference cancellation

Such a reception enhancement functionality typically requires some computational power (e.g. for carrying out the processing of the received signal values), which typically increases the power consumption of the mobile terminal 118 when it is used by the mobile terminal 118, i.e. when the enhancement functionality is activated in the mobile terminal 118.

To save power on the mobile terminal side, such functionalities may therefore be implemented to be used dynamically, e.g. like dynamic RxDiv. In this case, the enhancement functionality is only switched on if the performance gain is needed, for example when the mobile terminal 118 encounters bad radio transmission conditions (e.g. high interference). Otherwise, the mobile terminal 118 may save power by not using the feature.

For the network side, an improved reception performance of the mobile terminal 118 typically means that less communication resources such as downlink power, downlink codes etc. are required by the mobile terminal 118. Thus, a mobile terminal 118 which does not use its reception enhancing functionalities will typically request more communication resources than necessary from a network point of view. If the mobile terminal 118 is in a relatively empty radio cell, this might not be so relevant for the network. However, if the load in the network (or even only the radio cell in which the mobile terminal 118 is located) as high load, the mobile terminal 118 could support and/or improve the network coverage by improving its reception performance (e.g. its demodulation performance) with the reception enhancement functionalities is supports.

Thus, there may exist a conflict between the mobile terminal 118 (i.e. the user of the mobile terminal 118), which wants to save power by not using a reception enhancement functionality if not necessary, and the network (i.e. the network operator), which would need to spend fewer communication resources for the mobile terminal 118 if the mobile terminal 118 would use the reception enhancement functionality.

For example, a mobile terminal specific dynamic algorithm, like dynamic RxDiv, may switch a mobile terminal reception enhancement feature on and off but this switching is typically based only on the mobile terminal perspective. This means that, typically, the mobile terminal activates the reception performance enhancement functionality in case the mobile terminal determines that it is in bad radio conditions and needs the reception enhancement but does not consider the general network state.

Embodiments can be seen to provide a link between the mobile terminal 118 and the network regarding the conflict between the wish to save power at the mobile terminal side and the wish to save computational resources on the network side.

Figure 2:
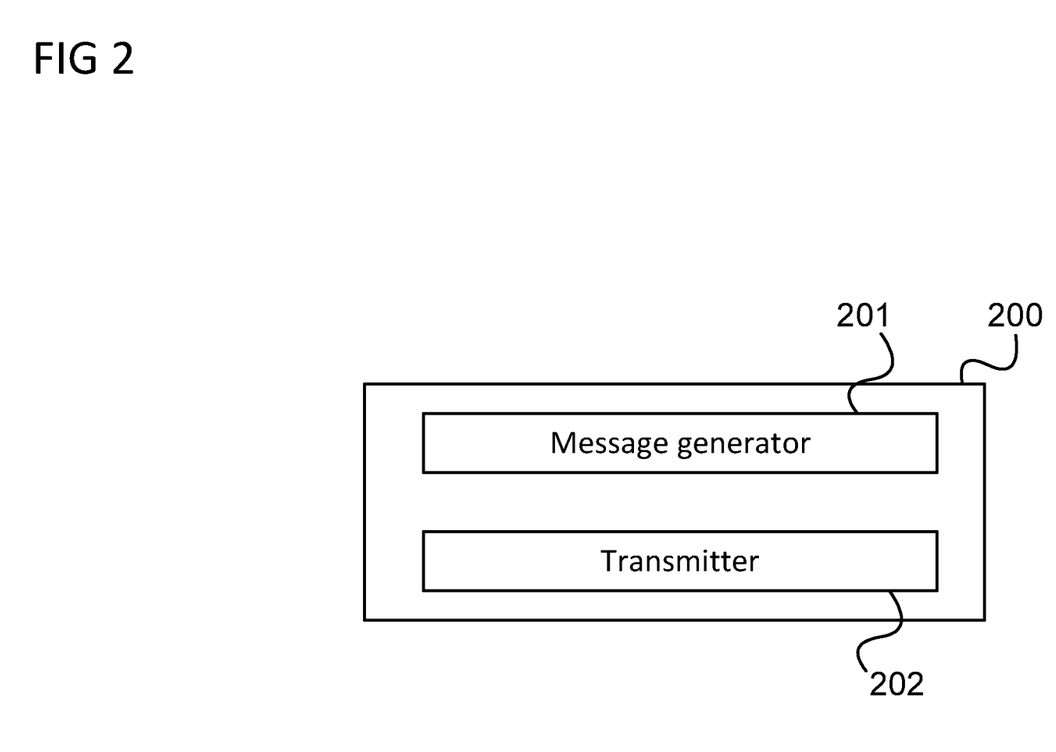
FIG. 2 shows a base station of a mobile communication network according to an embodiment.

A base station, e.g. corresponding to one of the base stations 108, 109, 110, 111, according to an embodiment is illustrated in FIG. 2.

FIG. 2 shows a base station 200 of a mobile communication network according to an embodiment.

The base station 200 includes a message generator 201 configured to generate a message indicating that at least one mobile communication terminal should use a reception enhancement functionality and a transmitter 202 configured to transmit the message to the at least one mobile communication terminal.

According to one embodiment, in other words, a base station can request of a mobile terminal to turn on (or activate) a reception performance enhancement feature. In other words, the network can overrule a possible decision on the mobile terminal side to rather save power (i.e. accumulator power) instead of enhancing its reception capabilities. The network can thus, if there is need, for example in case of high load of the mobile communication network, have the reception enhancement functionality of the mobile terminal activated which may allow the mobile communication network to redistribute communication resources to other mobile terminals, e.g. to reduce the transmit power for the mobile terminal and thus reduce interference for the other mobile terminals.

According to one embodiment, the reception enhancement functionality is at least one of receive diversity, equalization and interference cancellation.

According to one embodiment, the message indicates whether the at least one mobile communication terminal should use the reception enhancement functionality.

According to one embodiment, the transmitter transmits the message to the at least one mobile communication via broadcast.

The base station may operate a radio cell and the transmitter is configured to transmit the message to all communication terminals using the radio cell.

For example, wherein the message indicates for all mobile communication terminals using the radio cell that the mobile communication terminals should use the reception enhancement functionality.

According to one embodiment, the message is a dedicated message to a mobile communication terminal.

The indication is for example a bit, i.e. for example a single bit.

The message may further include an indication of a priority level of the usage of the reception enhancement functionality. The priority level may for example indicate the number of reception enhancement functionalities that should be activated by the communication terminal. For example, a first (lower) priority level indicates that only one reception enhancement functionality is to be used while a second (higher) priority level indicates that all available reception enhancement functionalities should be used by the communication terminal. The priority level may for example be indicated by one or more (additional) bits.

According to one embodiment, the base station operates a radio cell, further includes a determiner configured to determine the load in the radio cell and wherein the message generator is configured to generate the message and the transmitter is configured to transmit the message if the determined load in the radio cell is above a predetermined threshold.

According to one embodiment, the message generator is configured to generate the message and the transmitter is configured to transmit the message repeatedly for a predetermined time period.

According to one embodiment, the base station further includes a determiner configured to determine the quality of a communication connection between the base station and the communication terminal and wherein the message generator is configured to generate the message and the transmitter is configured to transmit the message if the determined quality is below a predetermined threshold. For example, in a UTMS communication system, it may be avoided that the mobile terminal enters compressed mode which may lead to a further degradation of the reception performance.

Figure 3:
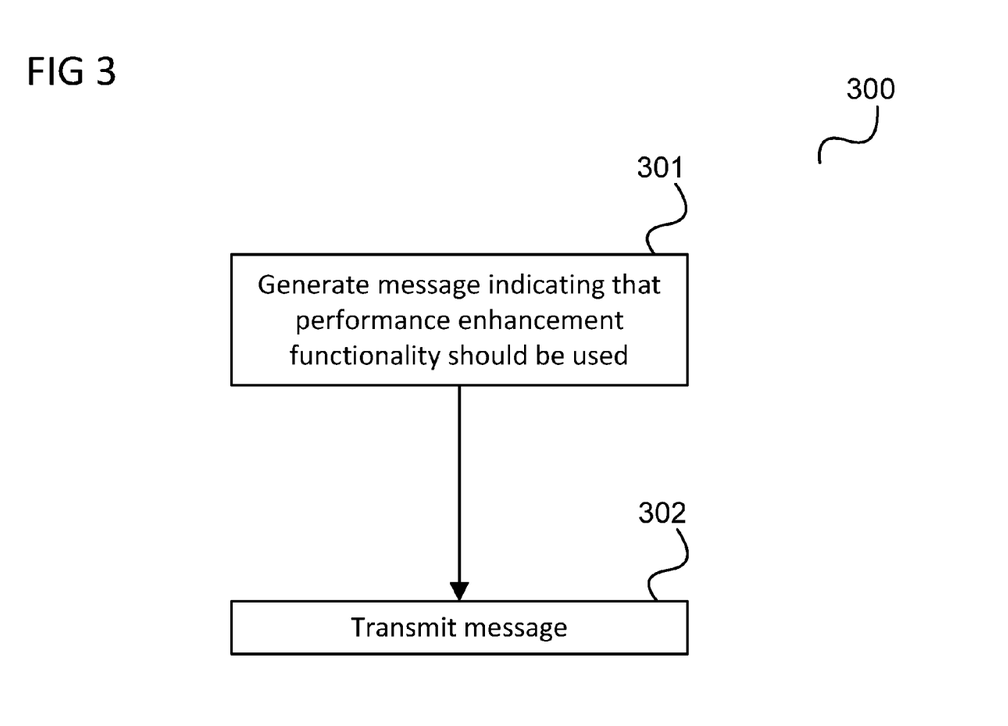
FIG. 3 shows a flow diagram according to an embodiment.

The base station may for example carry out a method as illustrated in FIG. 3.

FIG. 3 shows a flow diagram 300 according to an embodiment.

The flow diagram 300 illustrates a method for controlling a communication terminal.

In 301, a message is generated (e.g. by a base station) indicating that at least one mobile communication terminal should use a reception enhancement functionality.

In 302, the message is transmitted to the at least one mobile communication terminal.

Figure 4:
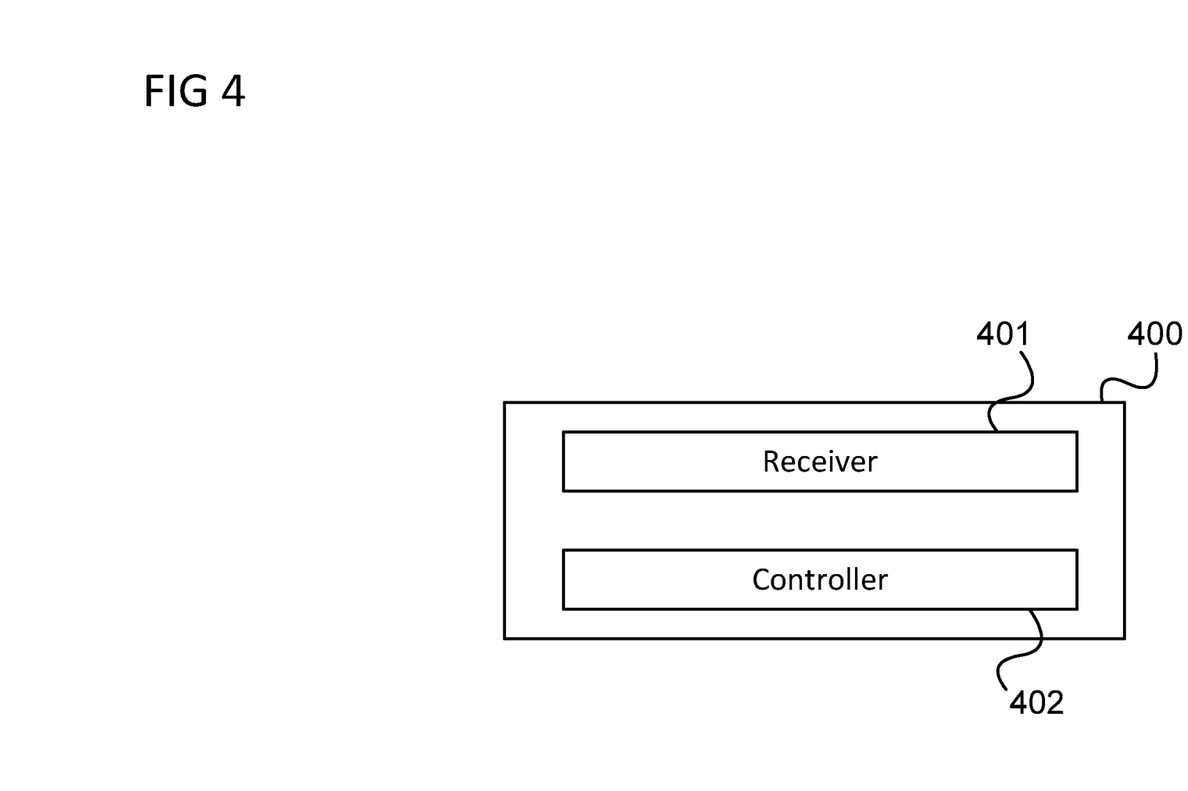
FIG. 4 shows a communication terminal according to an embodiment.

The base station 200 for example communicates with a communication terminal as illustrated in FIG. 4.

FIG. 4 shows a communication terminal 400 according to an embodiment.

The communication terminal 400 includes a receiver 401 configured to receive a message from a base station of a mobile communication network indicating that the communication terminal should use a reception enhancement functionality.

The communication terminal 400 further includes a controller 402 configured to control the receiver 401 to use the reception enhancement functionality in response to the reception of the message.

Figure 5:
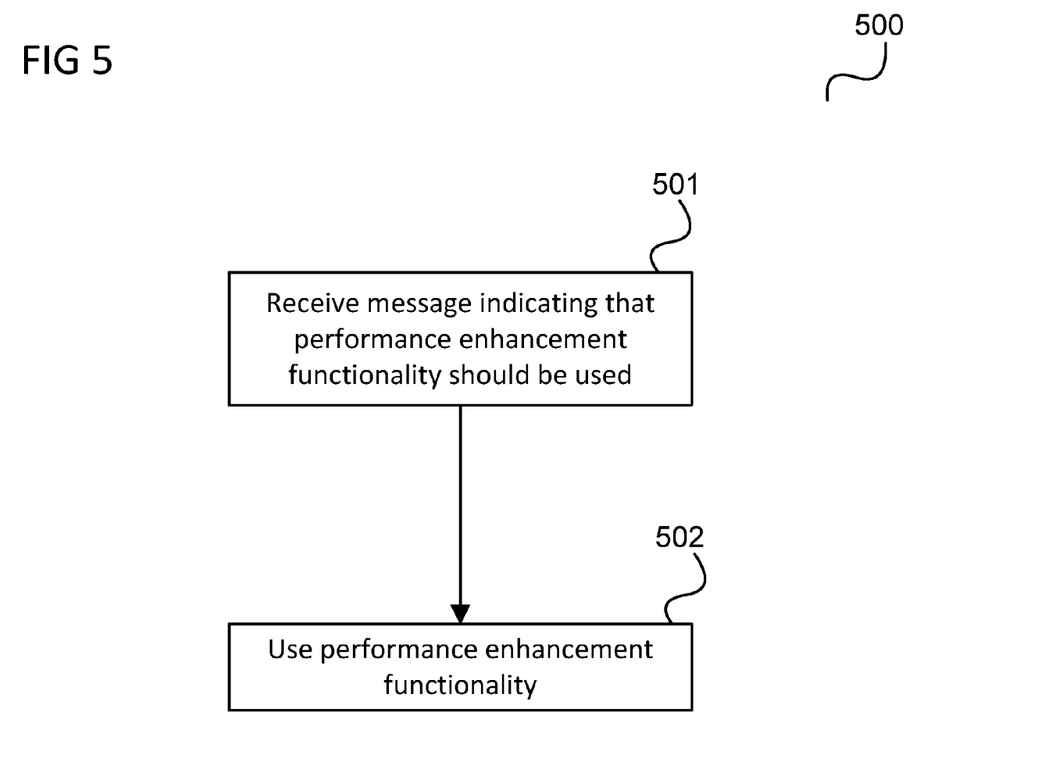
FIG. 5 shows a flow diagram according to an embodiment.

The communication terminal for example carries out a method as illustrated in FIG. 5.

FIG. 5 shows a flow diagram 500 according to an embodiment.

The flow diagram 500 illustrates a method for operating a communication terminal.

In 501, a message is received from a base station of a mobile communication network indicating that the communication terminal should use a reception enhancement functionality.

In 502, the receiver is controlled to use the reception enhancement functionality in response to the reception of the message.

It should be noted that the network operator may have the interest to satisfy both low power consumption on the mobile terminal side as well as a requirement for only a little amount of radio communication resources by the mobile terminal. A low mobile terminal power consumption may be desirable for the network operator since it is good for the end customer's user experience (longer battery life, talk time, . . . ). A requirement for only a little amount of radio communication resources per mobile terminal leads to high network capacity and allows supporting as many mobile terminals as possible with a good performance. Thus, it may be in the interest of the network operator to balance these two contradicting demands.

For example, the network operator may like to push the mobile terminal to turn its reception enhancement functionality on when the mobile terminal is in a radio cell which is relatively full and where radio communication resources are thus very limited (i.e. relatively scarce). Thus, according to one embodiment, a base station 108, 109, 110, 111 requests the mobile terminal 118 to turn off its reception enhancement functionality independently from the mobile terminal view, i.e. independent from whether the mobile terminal 118 determines, from its own view, that it requires the performance enhancement. In case that the mobile terminal 118 is located in (and camped on) a relatively empty radio cell, in which a high amount of radio communication resources are available, according to one embodiment, the network does not require the activation of a reception enhancement functionality by the mobile terminal 118. In contrast, the network may leave the decision and control whether to activate the reception performance enhancement functionality to the mobile terminal 118. The network may even actively push the mobile terminal 118 to save power by requesting it to turn the reception enhancement feature off. As compensation for turning the reception enhancement feature off the network may offer more radio communication resources to the mobile terminal 118.

An example for an activation of a reception enhancement functionality depending on the location of a mobile terminal is illustrated in the following in FIGS. 6 and 7.

Figure 6:
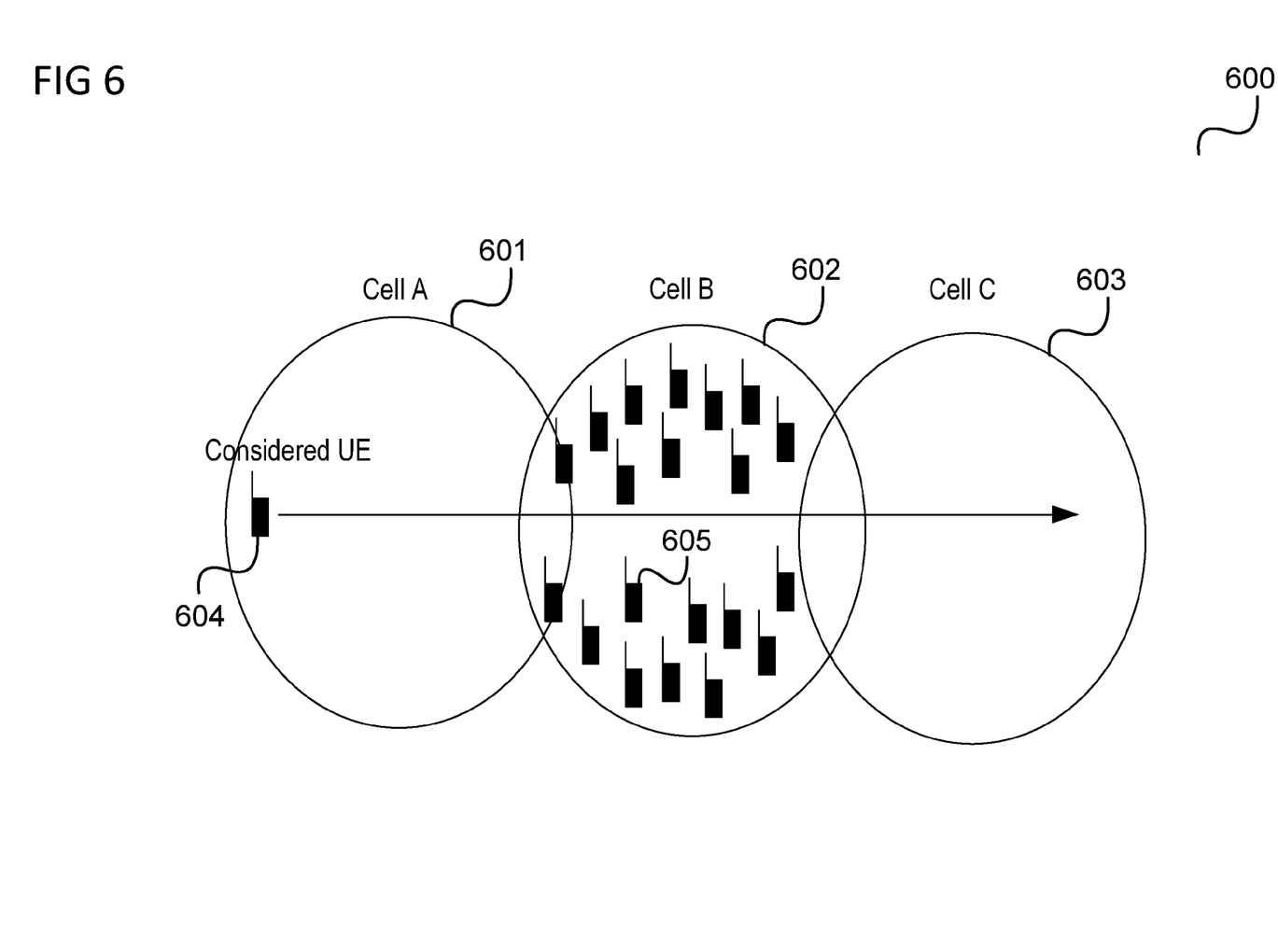
FIG. 6 shows a radio cell arrangement according to an embodiment.

FIG. 6 shows a radio cell arrangement 600 according to an embodiment.

The radio cell arrangement 600 includes a first radio cell 601, a second radio cell 602 and a third radio cell 603. The radio cells 601, 602, 603 are operated by base stations (not shown in FIG. 6), for example corresponding to the base stations 108, 109, 110, 111 of the communication system 100 shown in FIG. 1.

In this example, it is assumed that a mobile terminal 604, e.g. corresponding to the mobile terminal 118, moves from the first radio cell 601, which is assumed to have little load (e.g. is empty), through the second radio cell 602 which is assumed to have high load (e.g. is full of other mobile terminals 605) to the third radio cell 603 which is assumed to have little load (e.g. is again empty) cell.

Figure 7:
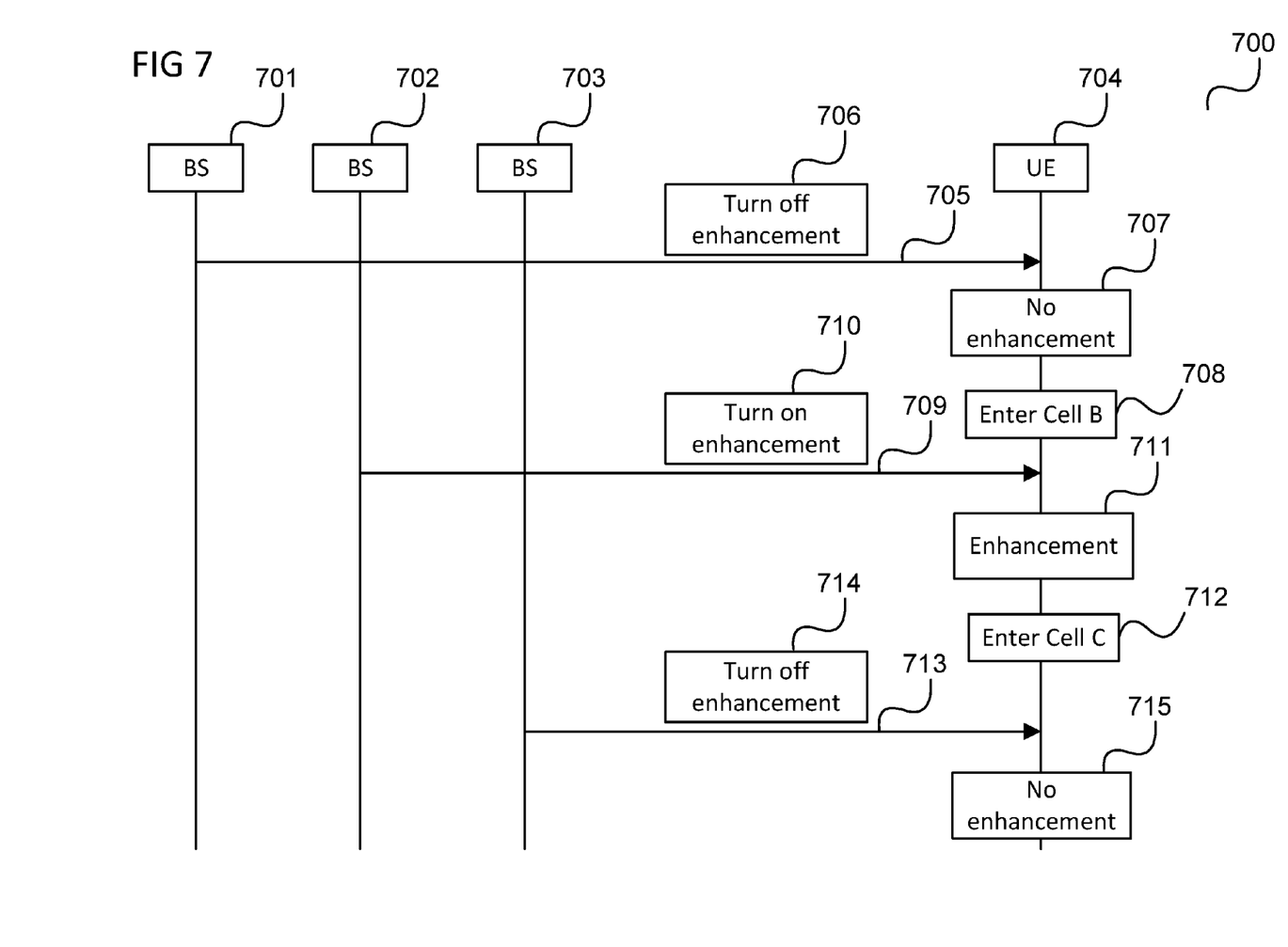
FIG. 7 shows a message flow diagram according to an embodiment.

A corresponding message flow between the base stations operating the radio cells 601, 602, 603 and the mobile terminal 604 is illustrated in FIG. 7.

FIG. 7 shows a message flow diagram 700 according to an embodiment.

The message flow takes place between a first base station 701 operating the first radio cell 601, a second base station 702 operating the second radio cell 602, a third base station 703 operating the third radio cell 603 and a mobile terminal 704 corresponding to the mobile terminal 604.

In 705, since the first radio cell 601 has little load, the first base station 701 sends a first message 706 to the mobile terminal 704 indicating that the mobile terminal 704 may (or, in one embodiment, should) turn of its reception performance enhancement functionalities. It should be noted that the first message 706 and similar messages requesting to turn on or turn off a reception performance enhancement functionality may be specify that a specific reception performance enhancement functionality should be turned on/off or may specific that all reception performance enhancement functionalities should be turned on/off.

In 707, according to the first message 506, the mobile terminal 704 does not use the performance enhancement functionality, e.g. deactivates the performance enhancement functionality if it has previously been activated. According to one embodiment, in case that the first message 706 indicates that the mobile terminal 704 is allowed to turn off the performance enhancement functionality but is not requested to turn it off, the mobile terminal 704 may decide on its side whether to use the performance enhancement functionality and may act accordingly.

It is assumed that in 708, the mobile terminal 704 enters the second radio cell 602 and registers in the second radio cell 602.

In 709, since it is assumed that it has been determined that the second radio cell 602 has high load, the network (including the base stations 701, 702, 703) would like the mobile terminal 704 to use its performance enhancement functionalities.

Accordingly, the second base station 702 sends a second message 710 to the mobile terminal 704 indicating that the mobile terminal 704 is requested to use its performance enhancement functionalities.

In 711, in accordance with the second message 710, the mobile terminal 704 turns on its performance enhancement functionalities.

It is assumed that in 712, the mobile terminal 704 enters the third radio cell 603.

In 713, since the third radio cell 603 has little load, the third base station 703 sends a third message 714 to the mobile terminal 704 indicating that the mobile terminal 704 may (or, in one embodiment, should) turn of its reception performance enhancement functionalities.

In 715, according to the third message 714, the mobile terminal 704 does not use the performance enhancement functionality, e.g. deactivates the performance enhancement functionality if it has previously been activated. In one embodiment, in case that the third message 714 indicates that the mobile terminal 704 is allowed to turn off the performance enhancement functionality but is not requested to turn it off, the mobile terminal 704 may decide on its side whether to deactivate the performance enhancement functionality and may act accordingly.

It should be noted that in one embodiment, the signaling does not have to be carried out on a radio cell basis, but may be carried out on a network area basis. For example, for a certain coverage area of the mobile communication network, mobile terminals may be required to turn on their performance enhancement functionalities.

The messages 706, 710, 714 may be individual messages sent to the mobile terminal 704 or may be broadcast messages, e.g. broadcast by the respective base station 701, 702, 703 within the respective radio cell. By using broadcast in a radio cell, the request for the mobile terminals within the radio cell to turn on/off their reception performance enhancement functionality may be implemented using a single bit in the broadcast channel of the radio cell. This bit could, according to its two possible values, signal to the mobile terminals within the radio cell whether they should turn on their reception performance enhancements or not. In one embodiments, a plurality of bits are used, for example to signal a priority level of the request to turn on/off the reception performance enhancements, i.e. a level of priority of the request compared to one or more other criteria based on which the mobile terminal decides whether to use or not use one or more reception performance enhancements. For example, using a certain bit value combination, it may be signaled to the mobile terminals that mobile terminals with a low battery level are allowed to keep their reception performance enhancements off.

It should be noted that via respective operator approval tests for mobile terminals, the network operator could also force the mobile terminal manufacturers (or terminal chip manufacturers, respectively) to implement functionalities (e.g. certain algorithms) on the mobile terminal side that allow detecting and/or measuring the communication resource situation in the network. For example, a mobile could (on its own) estimate the load of the radio cell in which it is located (e.g. by comparing common pilot power to total cell power) and accordingly switch on/off its enhancement functionalities autonomously, e.g. based on a threshold. For example, if a mobile terminal with two possible enhancement functionalities detects a radio cell load of above 50% it switches on a first enhancement functionality and if the radio cell load exceeds 90% it switches on a second enhancement functionality. This switching on/off of the enhancement functionalities may for example be independent from the mobile terminal needs (e.g. independent from a wish to save power on the mobile terminal side). In one embodiment, the mobile terminal can combine its own necessities with the ones of the network (as signaled by the network or as measured by the mobile terminal). For example, if the mobile terminal needs an enhancement functionality to be activated to avoid a call drop, it can switch it on, independently from the network status (e.g. the cell load etc.).

An example for a trigger to activate one or more enhancement functionalities is compressed mode, i.e., e.g. impending transition into compressed mode. When compressed mode is activated to search for alternative frequencies or RATs, the demodulation performance on the current frequency typically degrades. Thus, according to one embodiment, before switching to compressed mode all enhancement functionalities are activated to avoid compressed mode if possible. Since the network configures compressed mode it can inform the mobile terminal before entering compressed mode to activate its enhancement functionalities. In one embodiment the mobile terminal knows the trigger conditions for compressed mode and activates the enhancement functionalities short before the compressed mode trigger conditions would be reached.

The request messages sent by the network, e.g. the request messages 706, 710, 712 described with reference to FIG. 7, e.g. the signaling of an "enable enhancements bit" indicating that performance enhancement functionalities should be switched on can be done in different time frames (and, accordingly, at a different frequency of possible changes to the activation of the performance enhancement functionalities). For example, a signaling to turn on/off performance enhancement functionalities can be done

- Instantaneously based on the current radio cell load (i.e., for example every few UMTS frames). This would mean relatively frequent updates of what it signaled, e.g. of the information broadcast via a broadcast channel.
- Permanently at Hot-Spots, e.g. airports, train stations, etc.
- For a certain time, e.g. at an event at a stadium or during rush hour at train stations It should be noted that adding information to one or more broadcast channels or dedicated signaling channels may require a change of the communication standard for existing communication systems. However, with strong support from the network operators this may be possible. Triggering conditions for performance enhancement functionalities on the mobile terminal side, i.e. for example a decision on the mobile terminal side only without instructions from the network, would not require a change of a communication standard. The network operators could in this case enforce and verify the decision algorithms by special tests which check if the decision algorithms are implemented in the mobile terminals.

As described above, according to various embodiments, mobile terminal performance enhancement functionalities may be turned on/off to balance mobile terminal current consumption and network capacity/resources. This may be done with active input by the network via signaling (broadcast or dedicated). It could alternatively be done autonomously by the mobile terminal, e.g. via estimation of cell load.

It should be noted that embodiments described in context of the base station illustrated in FIG. 2, are analogously valid for the method illustrated in FIG. 3, the communication terminal illustrated in FIG. 4 and the method illustrated in FIG. 5 and vice versa.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A base station of a mobile communication network comprising:
   a message generator configured to generate a message from the base station to at least one mobile communication terminal having decided to remain in a power saving mode, the message instructing the at least one mobile communication terminal to instead use a reception enhancement functionality; and
   a transmitter configured to transmit the message to the at least one mobile communication terminal;
   wherein the base station operates a radio cell, and further comprises a determiner configured to determine a load in the radio cell, the load being representative of a number of mobile communication terminals currently operating in the radio cell, and wherein the message generator is configured to generate the message and the transmitter is configured to transmit the message if the determined load in the radio cell is above a predetermined threshold.

2. The base station according to claim 1, wherein the reception enhancement functionality is at least one of receive diversity, equalization and interference cancellation.

3. The base station according to claim 1, wherein the message indicates whether the at least one mobile communication terminal should use the reception enhancement functionality.

4. The base station according to claim 1, wherein the transmitter transmits the message to the at least one mobile communication via broadcast.

5. The base station according to claim 1, wherein the base station operates a radio cell and the transmitter is configured to transmit the message to all communication terminals using the radio cell.

6. The base station according to claim 5, wherein the message indicates for all mobile communication terminals using the radio cell that the mobile communication terminals should use the reception enhancement functionality.

7. The base station according to claim 1, wherein the message is a dedicated message to a mobile communication terminal.

8. The base station according to claim 1, wherein the instruction is a bit.

9. The base station according to claim 1, wherein the message further comprises an indication of a priority level of the usage of the reception enhancement functionality.

10. The base station according to claim 1, wherein the message generator is configured to generate the message and the transmitter is configured to transmit the message repeatedly for a predetermined time period.

11. The base station according to claim 1, wherein the base station further comprises a determiner configured to determine the quality of a communication connection between the base station and the communication terminal and wherein the message generator is configured to generate the message and the transmitter is configured to transmit the message if the determined quality is below a predetermined threshold.

12. A method for controlling a communication terminal comprising:
   determining a load in a radio cell in which the communication terminal is located, the load being representative of a number of mobile communication terminals currently operating in the radio cell; and
   if the determined load in the radio cell is above a predetermined threshold,
      generating message from a base station to at least one mobile communication terminal currently operating in the radio cell and having decided to remain in a power saving mode, the message instructing the at least one mobile communication terminal to instead use a reception enhancement functionality; and
   transmitting the message to the at least one mobile communication terminal.

* * * * *